United States Patent
Kim

(10) Patent No.: US 10,312,541 B2
(45) Date of Patent: Jun. 4, 2019

(54) POLYOL-BASED COMPOSITIONS COMPRISING CATIONIC GROUP-FUNCTIONALIZED POLYPHENYLENE POLYMERS

(71) Applicant: Los Alamos National Security, LLC, Los Alamos, NM (US)

(72) Inventor: Yu Seung Kim, Los Alamos, NM (US)

(73) Assignee: Triad National Security, LLC, Los Alamos, NM (US)

( * ) Notice: Subject to any disclaimer, the term of this patent is extended or adjusted under 35 U.S.C. 154(b) by 278 days.

(21) Appl. No.: 15/204,523

(22) Filed: Jul. 7, 2016

(65) Prior Publication Data

US 2017/0033385 A1 Feb. 2, 2017

Related U.S. Application Data

(60) Provisional application No. 62/199,129, filed on Jul. 30, 2015.

(51) Int. Cl.

| | |
|---|---|
| *H01M 8/10* | (2016.01) |
| *C08G 61/10* | (2006.01) |
| *B01J 41/12* | (2017.01) |
| *H01M 8/1023* | (2016.01) |
| *B01J 41/13* | (2017.01) |
| *C08J 5/22* | (2006.01) |
| *B01J 47/12* | (2017.01) |

(Continued)

(52) U.S. Cl.
CPC .......... *H01M 8/1023* (2013.01); *B01J 41/13* (2017.01); *B01J 47/12* (2013.01); *C08G 61/10* (2013.01); *C08J 5/2256* (2013.01); *C08G 2261/143* (2013.01); *C08G 2261/148* (2013.01); *C08G 2261/312* (2013.01); *C08G 2261/51* (2013.01); *C08J 2365/02* (2013.01); *H01M 4/881* (2013.01); *H01M 8/1081* (2013.01); *H01M 2008/1095* (2013.01); *H01M 2300/0082* (2013.01); *Y02P 70/56* (2015.11)

(58) Field of Classification Search
CPC ......... H01M 8/1023; H01M 208/1095; H01M 2300/0082; Y02P 70/56; C08G 2261/143; C08G 2261/148; C08G 2261/312; C08G 2261/51; C08G 61/10; C08J 5/2256; C08J 2365/02; B01J 41/13; B01J 47/12
See application file for complete search history.

(56) References Cited

U.S. PATENT DOCUMENTS

| | | |
|---|---|---|
| 5,525,436 A | 6/1996 | Savinell et al. |
| 6,468,684 B1 | 10/2002 | Chisholm et al. |

(Continued)

OTHER PUBLICATIONS

Bozkurt et al., "Proton-conducting Polymer Electrolytes based on Phosphoric Acid," *Solid State Ionics* 125(1-4):225-233 (1999).

(Continued)

*Primary Examiner* — Brittany L Raymond
(74) *Attorney, Agent, or Firm* — Klarquist Sparkman, LLP

(57) ABSTRACT

Disclosed herein are embodiments of compositions comprising polyols and cationic group-functionalized polyphenylene polymers suitable for use in electrochemical systems. The disclosed composition exhibit improved dispersion properties and further provide anion exchange polymer membranes exhibited improved chemical and mechanical properties. Also disclosed herein are methods of making and using the disclosed compositions.

17 Claims, 3 Drawing Sheets

(51) Int. Cl.
  *H01M 8/1081* (2016.01)
  *H01M 8/1018* (2016.01)
  *H01M 4/88* (2006.01)

(56) References Cited

U.S. PATENT DOCUMENTS

| | | | |
|---|---|---|---|
| 6,946,211 | B1 | 9/2005 | Bjerrum et al. |
| 7,108,934 | B2 | 9/2006 | Narayanan et al. |
| 7,618,732 | B2 | 11/2009 | Nakato et al. |
| 7,662,194 | B2 | 2/2010 | Kim et al. |
| 7,858,260 | B2 | 12/2010 | Lee et al. |
| 7,883,791 | B2 | 2/2011 | Nakato et al. |
| 7,888,397 | B1 | 2/2011 | Hibbs et al. |
| 8,809,483 | B1 | 8/2014 | Hibbs |
| 2005/0095486 | A1* | 5/2005 | Hamamoto ............ B01D 69/12 429/483 |
| 2012/0225371 | A1* | 9/2012 | Kim ...................... H01M 8/083 429/484 |
| 2015/0307654 | A1* | 10/2015 | Hibbs ................. H01M 8/1023 521/27 |
| 2017/0190831 | A1 | 7/2017 | Kim et al. |

OTHER PUBLICATIONS

Chen et al., "Chemically stable hybrid polymer electrolyte membranes prepared by radiation grafting, sulfonation, and silane-crosslinking techniques," *Journal of Polymer Science Part A Polymer Chemistry* 46(16):5559-5567 (2008).

Fu et al., "SPEEK/epoxy resin composite membranes in situ polymerization for direct methanol fuel cell usages," *Journal of Power Sources* 165(2):708-716, Mar. 20, 2007.

Gupta et al., "Comparison of conversion and deposit formation of ethanol and butane under SOFC conditions," *Journal of Power Sources* 158(1):497-503, available online Nov. 14, 2005.

Huang et al., "Effects of dopant on the electrochemical performance of Li4Ti5O12 as electrode material for lithium ion batteries," *Journal of Power Sources* 165(1):408-412, available online Dec. 16, 2006.

Jeong et al., "Cross-Linking Density Effect of Fluorinated Aromatic Polyethers on Transport Properties," *Macromolecules* 42(5):1652-1658, Feb. 4, 2009.

Jin et al., "Proton conduction in metal pyrophosphates (MP2O7) at intermediate temperatures," *Journal of Materials Chemistry* 20(30):6214-6217, Feb. 16, 2010.

Kim et al., "Processing induced morphological development in hydrated sulfonated poly(arylene ether sulfone) copolymer membranes," *Polymer* 44(19):5729-5736, Sep. 2003.

Kundu et al., "Mechanical Properties of Nafion™ Electrolyte Membranes under Hydrated Conditions," *Polymer* 46(25):11707-11715, 2005.

Lee et al., "Robust Hydroxide Ion Conducting Poly(biphenyl alkylene)s for Alkaline Fuel Cell Membranes," *ACS Macro Letters* 4(8):814-818, Jul. 16, 2015.

Liang et al., "FT-IR study of the microstructure of Nafion® membrane," *Journal of Membrane Science* 233(1-2):39-44, Apr. 15, 2004.

Schmidt et al., "Properties of High Temperature PEFC Celtex®-P1000 MEAs in Start/Stop Operation Mode," *Journal of Power Sources* 176(2):428-434, Feb. 1, 2008.

Xiao et al., "High-Temperature Polybenzimidazole Fuel Cell Membranes via a Sol-Gel Process," *Chemistry of Materials* 17(21):5328-5333, published online Sep. 21, 2005.

Zhang et al., "A new and facile approach for the preparation of cross-linked sulfonated poly(sulfide sulfone) membranes for fuel cell application," *Journal of Power Sources* 170(1):42-45, Jun. 30, 2007.

Choe et al., "Alkaline Stability of Benzyl Trimethyl Ammonium Functionalized Polyaromatics: A Computational and Experimental Study," *Chemistry of Materials*, 26(19): 5675-5682, Sep. 17, 2014.

Fujimoto et al., "Backbone stability of quaternized polyaromatics of alkaline membrane fuel cells," *Journal of Membrane Science*, vol. 423-424, pp. 438-449, Sep. 1, 2012.

Hibbs et al., "Synthesis and Characterization of Poly(phenyene)-Based Anion Exchange Membranes for Alkaline Fuel Cells," *Macromolecules*, vol. 42, pp. 8316-8321, Aug. 24, 2009.

Janarthanan et al., "A Direct Methanol Alkaline Fuel Cell Based on Poly(phenylene) Anion Exchange Membranes," *Journal of the Electrochemical Society*, 161(9): F944-F950, Jun. 24, 2014.

Switzer et al., "Novel FOH-free anion-exchange membrane fuel cell: Performance comparison of alternative anion-exchange ionomers in cayalyst ink," *Electrochimica Acta*, vol. 55, pp. 3404-3408, Jan. 11, 2010.

\* cited by examiner

POLYOL-BASED COMPOSITIONS COMPRISING CATIONIC GROUP-FUNCTIONALIZED POLYPHENYLENE POLYMERS

CROSS REFERENCE TO RELATED APPLICATION

This application claims the benefit of and priority to the earlier filing date of U.S. Provisional Patent Application No. 62/199,129, filed on Jul. 30, 2015, the entirety of which is incorporated by reference herein.

ACKNOWLEDGMENT OF GOVERNMENT SUPPORT

This invention was made with government support under Contract No. DE-AC52-06NA25396 awarded by the U.S. Department of Energy. The government has certain rights in the invention.

FIELD

The present disclosure concerns compositions comprising cationic group-functionalized polyphenylene polymers and a suitable dispersion medium. The disclosed compositions can be used to make components for use in electrochemical systems and devices.

BACKGROUND

Ion exchange polymer electrolyte membranes and their dispersions in liquid medium are used for membrane-based electrochemical systems, such as fuel cells and water electrolysis systems. Typically, electrochemical systems are categorized into acidic and alkaline systems based on their operating environments. Acidic electrochemical systems are operated under low pH and typically use a cation (or proton) exchange polymer electrolyte. In cation exchange polymer electrolytes, anionic functional groups (e.g., sulfonic acid group) are tethered in polymer backbones or polymer side chains to conduct protons. Alkaline electrochemical systems are operated under high pH and typically use an anion (or hydroxide) exchange polymer electrolyte. In anion exchange polymer electrolytes, cationic functional groups (e.g., quaternary ammonium groups) typically are tethered in polymer backbones or polymer side chains to conduct hydroxide ions.

Acidic membrane-based electrochemical energy systems are popular, primarily due to the commercial availability of perfluorosulfonic acid. The commercially available perfluorosulfonic acid polymers have good proton conductivity (~100 mS/cm at 30° C.) as well as good chemical, mechanical, and thermal stability. The perfluorinated polymer electrolytes have significant advantages over hydrocarbon-based polymers due to their higher oxygen permeability, hydrophobicity, low catalyst poisoning, ideal three-phase interface, and ability to create a porous electrode structure. Such acidic systems, however, exhibit low efficiency of the oxygen reduction reaction of the electrocatalysts. As a result, expensive platinum-based catalysts typically are required for good cell performance.

For alkaline electrochemical systems, no industrial standard anion exchange membranes and liquid dispersions are available. Cationic group-functionalized polyaromatic anion exchange membranes have potential for use in electrochemical energy systems, particularly alkaline systems, because of their conductivity, film formability and high chemical stability. However, these polyaromatic anion exchange membranes are not readily incorporated into typical solvents used for such systems, particularly alkaline electrochemical systems. There exists a need in the art for compositions that comprise cationic group-functionalized polyaromatic polymers and dispersion media that can be used in electrochemical systems, such as alkaline and acidic electrochemical systems.

SUMMARY

Disclosed herein are embodiments of a composition for use in an electrochemical system, comprising a cationic group-functionalized polyphenylene polymer having structures satisfying formulas described herein and a dispersion medium comprising a polyol having a methyl to hydroxyl ratio that provides a value ranging from 1 to 2. In some embodiments, wherein the cationic group-functionalized polyphenylene polymer is an alkyl trimethyl ammonium functionalized polyphenylene polymer, a benzyl trimethyl ammonium functionalized polyphenylene, or a combination thereof. The polyol can be a diol. In some embodiments, the diol comprises a hydroxyl group located at C1 of the diol and a hydroxyl group at C2 of the diol. In some embodiments, the dispersion medium comprises 1,2-propanediol, 1,3-propanediol, ethylene glycol, 1,2-butanediol, 1,3-butanediol, 2,3-butanediol, 1,4-butanediol, and combinations thereof.

The composition can further comprise one or more electrocatalysts. The electrocatalyst can comprise a metal, a transition metal, a metal alloy, a transition metal alloy, a carbon-based catalyst, or a combination thereof. In some embodiments, the metal is selected from platinum, gold, iridium, palladium, or a combination thereof. In some embodiments, the metal alloy is selected from a platinum/chromium alloy, a platinum/cobalt alloy, a platinum/iron alloy, or a combination thereof. In some embodiments, the transition metal is selected from ruthenium, iron, chromium, cobalt, molybdenum, manganese, magnesium, nickel, osmium, rhodium, tungsten, rhenium, yttrium, titanium, or combinations thereof. The carbon-based catalyst can be selected from porous carbon particulate, fiber, graphene, or combinations thereof. In some embodiments, the composition can further comprise a dilution solvent having a boiling temperature equal to or below the boiling temperature of the dispersion medium. Also disclosed herein are embodiments of an anion exchange polymer membrane for use in an electrochemical system, comprising a cationic group-functionalized polyphenylene polymer having a structure satisfying a formula described herein, wherein the anion exchange polymer membrane exhibits a tensile strength ranging from 12 MPa to 35 MPa, a elongation percentage ranging from 2% to 44%, a tensile toughness of 1 MPa to 20MPa, or a combination thereof. In some embodiments, the anion exchange polymer membrane can further comprise one or more electrocatalysts. In some embodiments, the one or more electrocatalyst is uniformly distributed in the anion exchange polymer membrane.

Also disclosed herein are embodiments of a method of making an anion exchange polymer membrane, comprising exposing a dispersion medium comprising a polyol having a methyl to hydroxyl ratio of 1:2 to a cationic group-functionalized polyphenylene polymer having a structure satisfying a formula described herein; and heating the dispersion medium and the cationic group-functionalized polyphenylene polymer at a temperature equal to or lower than the boiling point of the dispersion medium. In some embodiments, the method further comprises casting the dispersion medium and the cationic group-functionalized polymer on a substrate to form a layer of the anion exchange polymer membrane on the substrate. The temperature can range from 120° C. to 200° C. and in some embodiments can range from 140° C. to 180° C. Embodiments of an electrochemical device comprising the compositions or anion exchange membranes disclosed herein also are described.

The foregoing and other objects, features, and advantages of the present disclosure will become more apparent from the following detailed description, which proceeds with reference to the accompanying figures.

DETAILED DESCRIPTION

I. Explanation of Terms

Figure 1:
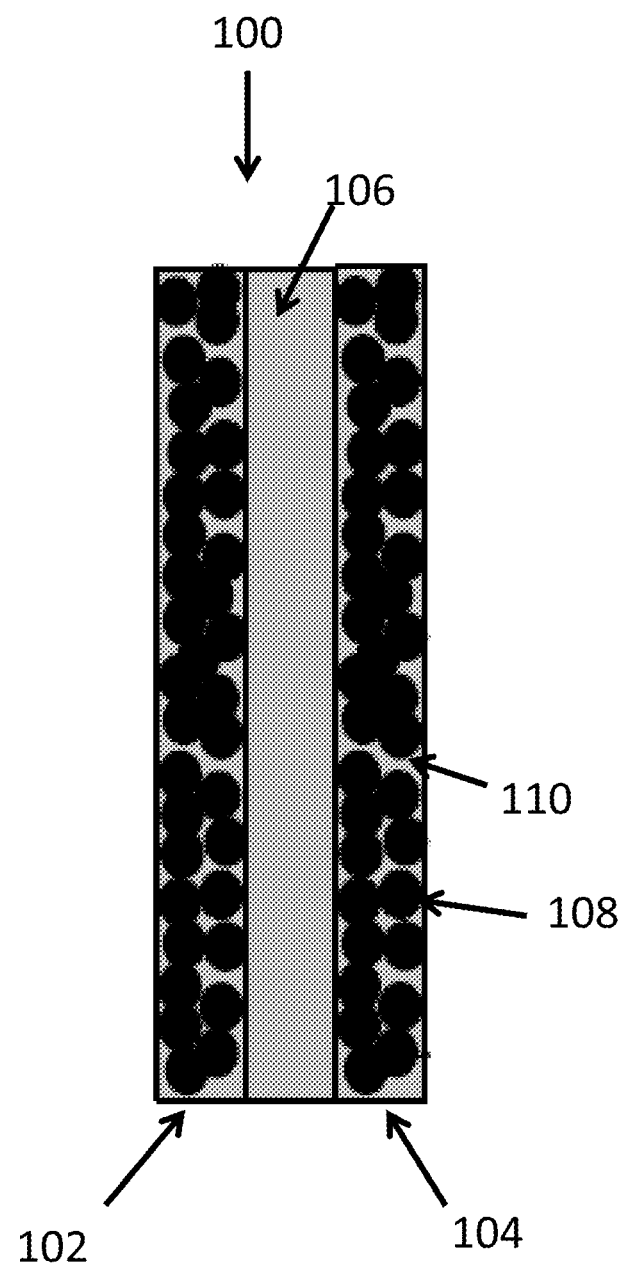
FIG. 1 illustrates an exemplary membrane electrode assembly comprising an anion exchange membrane that can be made using a composition embodiment disclosed herein.

The following explanations of terms are provided to better describe the present disclosure and to guide those of ordinary skill in the art in the practice of the present disclosure. As used herein, "comprising" means "including" and the singular forms "a" or "an" or "the" include plural references unless the context clearly dictates otherwise. The term "or" refers to a single element of stated alternative elements or a combination of two or more elements, unless the context clearly indicates otherwise.

Unless explained otherwise, all technical and scientific terms used herein have the same meaning as commonly understood to one of ordinary skill in the art to which this disclosure belongs. Although methods and materials similar or equivalent to those described herein can be used in the practice or testing of the present disclosure, suitable methods and materials are described below. The materials, methods, and examples are illustrative only and not intended to be limiting, unless otherwise indicated. Other features of the disclosure are apparent from the following detailed description and the claims.

Unless otherwise indicated, all numbers expressing quantities of components, molecular weights, percentages, temperatures, times, and so forth, as used in the specification or claims are to be understood as being modified by the term "about." Accordingly, unless otherwise indicated, implicitly or explicitly, the numerical parameters set forth are approximations that can depend on the desired properties sought and/or limits of detection under test conditions/methods familiar to those of ordinary skill in the art. When directly and explicitly distinguishing embodiments from discussed prior art, the embodiment numbers are not approximates unless the word "about" is recited. Furthermore, not all alternatives recited herein are equivalents.

To facilitate review of the various embodiments of the disclosure, the following explanations of specific terms are provided.

Aliphatic: A hydrocarbon, or a radical thereof, having at least one carbon atom to 50 carbon atoms, such as one to 25 carbon atoms, or one to ten carbon atoms, and which includes alkanes (or alkyl), alkenes (or alkenyl), alkynes (or alkynyl), including cyclic versions thereof, and further including straight- and branched-chain arrangements, and all stereo and position isomers as well. Alkenyl: An unsaturated monovalent hydrocarbon having at least two carbon atoms 50 carbon atoms, such as two to 25 carbon atoms, or two to ten carbon atoms, and at least one carbon-carbon double bond, wherein the unsaturated monovalent hydrocarbon can be derived from removing one hydrogen atom from one carbon atom of a parent alkene. An alkenyl group can be branched, straight-chain, cyclic (e.g., cylcoalkenyl), cis, or trans (e.g., E or Z).

Alkyl: A saturated monovalent hydrocarbon having at least one carbon atom to 50 carbon atoms, such as one to 25 carbon atoms, or one to ten carbon atoms, wherein the saturated monovalent hydrocarbon can be derived from removing one hydrogen atom from one carbon atom of a parent compound (e.g., alkane). An alkyl group can be branched, straight-chain, or cyclic (e.g., cycloalkyl).

Aliphatic aryl: $R^a$-aliphatic-aryl-, wherein $R^a$ is an atom of a phenyl ring making up the polymeric backbone of a polyphenylene polymer described herein to which the aliphatic group is bound. In some embodiments, the aliphatic group can be an alkyl group, and alkenyl group, or an alkynyl group. In some embodiments, the aryl group can further be bound to a cationic functional group (e.g., $R^a$-aliphatic-aryl-X), or it simply can be a terminal aryl group (e.g., $R^a$-aliphatic-aryl-H).

Alkynyl: An unsaturated monovalent hydrocarbon having at least two carbon atoms 50 carbon atoms, such as two to 25 carbon atoms, or two to ten carbon atoms and at least one carbon-carbon triple bond, wherein the unsaturated monovalent hydrocarbon can be derived from removing one hydrogen atom from one carbon atom of a parent alkyne. An alkynyl group can be branched, straight-chain, or cyclic (e.g., cycloalkynyl).

Aryl: An aromatic carbocyclic group comprising at least five carbon atoms to 15 carbon atoms, such as five to ten carbon atoms, having a single ring or multiple condensed rings, which condensed rings can or may not be aromatic provided that the point of attachment is through an atom of the aromatic carbocyclic group.

Aryl aliphatic: $R^a$-aryl-aliphatic-, wherein $R^a$ is an atom of a phenyl ring making up the polymeric backbone of a polyphenylene polymer described herein to which the aryl group is bound. In some embodiments, the aliphatic group can further be bound to a cationic functional group (e.g., $R^a$-aryl-aliphatic-X), or it simply can be a terminal aryl group (e.g., $R^a$-aryl-aliphatic-H). In some embodiments, the aliphatic group can be an alkyl group, and alkenyl group, or an alkynyl group.

Cationic groups: Organic or inorganic molecules with a positive charge. Solely by way of example, cationic groups can include, but are not limited to, ammonium, sulfonium, phosphonium, guanidinium, imidazolium, phosphazinium, and combinations thereof.

Carbonyl: —C(O)—.

Diol: A compound having two —OH groups.

Electrocatalyst: A metallic or non-metallic compound that has an electrochemical activity under alkaline and/or acidic conditions.

Ion Exchange Capacity: The measure of the ability of an insoluble material to undergo displacement of ions previously attached to the insoluble material, or electrostatically incorporated into its structure by oppositely charged ions present in a surrounding solution.

Methyl to Hydroxyl Ratio: A ratio of the number of carbon atoms (which can include a methyl group, a methylene group, or a combination of methyl and methylene groups) present in a polyol or diol to the number of hydroxyl groups present in a polyol or diol. Solely by way of example, propylene glycol comprises three carbon atoms (or one methyl group and two methylene groups) and 2 hydroxyl groups and therefore has a methyl to hydroxyl ratio of 3:2 (or 1.5).

Monohydric alcohol: A compound having one —OH group.

Polyol: A compound having at least two —OH groups, and may include sugar alcohols, also known as polyhydric alcohols. In embodiments where the compound comprises no more than two —OH groups, the compound also can be referred to as a "diol."

Sulfonyl: —SO$_2$—.

A person of ordinary skill in the art would recognize that the definitions provided above are not intended to include impermissible substitution patterns (e.g., methyl substituted with 5 different groups, and the like). Such impermissible substitution patterns are easily recognized by a person of ordinary skill in the art. Any functional group disclosed herein and/or defined above can be substituted with one or more substituents or unsubstituted, unless otherwise indicated herein. In some embodiments, the functional group can be substituted with one or more of the cationic groups disclosed herein.

II. Introduction

One particular problem associated with electrochemical systems, including both alkaline systems (e.g., alkaline membrane fuel cells) and acidic systems (e.g., acid membrane fuel cells), that has not yet been addressed by conventional techniques in the art is the dispersion of anion exchange polymers in suitable dispersion medium for membrane electrode assembly (MEA) fabrication. A stable dispersion of anion exchange polymers in a liquid medium, such as a dispersion media, should be maintained for electrode processing. The limited solubility of anion exchange polymers has been a significant inhibitor of successful application of such components in fuel cell assemblies (such as assemblies comprising MEAs). Conventional dispersing solvents for anion exchange polymers include water, monohydric alcohols, water/monohydric alcohol mixtures, and aprotic solvents (such as dimethyl acetamide, dimethylformamide, dimethylsulfoxide, n-methyl pyrrolidone, or butyl acetate); however, these types of solvents can be problematic when used in electrochemical systems for the reasons highlighted below.

Pure water is seldom used as a dispersing solvent because the solubility and dispersability of the polyaromatic anion exchange membranes and carbon based catalyst in water is poor. Pure monohydric alcohols have been used as dispersing solvents; however, due to the high evaporation rate of such alcohols, the formation of catalyst layers using these solvents is often not uniform and therefore use of such compounds as solvents in electrochemical systems is not preferred. In addition, the chemical oxidation (burning) of monohydric alcohols can occur when monohydric alcohols are in contact with highly active electrocatalysts, thus illustrating another reason why such compounds are not suitable solvents for electrochemical systems, such as alkaline and/or acidic systems.

Water/monohydric alcohol mixtures also have been used as a dispersing solvent; however, thin film polymer layers cast from water/monohydric alcohol mixtures are brittle. This brittleness is attributed to the poor polymer chain entanglement during the solution casting process. The brittle nature of solution cast membranes often results in multiple cracks in the electrode when the polymer is used as the electrode binding materials. Crack formation in fuel cells can deleteriously affect fuel cell durability. The electrode crack formation impacts the durability of both membrane and electrode. In particular, electrode crack formation derived from the poor solubility of ion exchange polymer electrolyte has a negative impact on electrode durability. For example, the polymer coated catalyst layer prepared from water/2-propanol mixture disclosed by Kim et al. (Physical Chemistry Chemical Physics, 16, 13, 5927-5932, 2014) generated multiple cracks in the electrodes, which propagate during the potential changes of the electrode and resulted in substantial performance loss. Also, the electrode crack formation derived from poor solubility of ion exchange polymer can adversely impact the membrane's durability.

Aprotic solvents such as dimethyl acetamide, dimethylformamide, dimethylsulfoxide, n-methyl pyrrolidone, or butyl acetate have limited ability to form dispersions for polyaromatic anion exchange polymers. Also, polymer dispersion in aprotic solvents often forms a gel or non-homogeneous dispersion.

The polymer backbone structure of polyaromatic anion exchange membranes is stable under low and high pH conditions, which contributes to their utility in electrochemical systems, particularly systems that operate at 80° C. However, polyphenylene-based anion exchange polymers have limited solubility in conventional solvents, such as methanol, ethanol/water mixtures, and N-methyl pyrrolidone. Also, the performance durability of alkaline membrane fuel cells using the polyphenylene membranes in such solvents typically is low and performance is therefore reduced. Such poor performance results from poor solubility of the anion exchange polymer in such solvents.

It has been discovered that it is possible to disperse cationic group-functionalized polyphenylene polymers, such as those having structures satisfying the formulas disclosed herein, in certain polyols (or mixtures of such polyols) using temperatures at or below the boiling point of the solvent. The presently disclosed compositions resolve many problems associated with the current state-of-the-art dispersing solvent systems, such as those discussed above. In particular disclosed embodiments, polyols, such as propanediols and ethylene glycols, have superior dispersion forming properties as compared to water, propanols, water/propanol mixtures, and aprotic solvents. In some embodiments, polyols, such as propanediols and ethylene glycols, can exhibit similar dispersion forming properties with methanol, ethanol, and water/monohydric alcohol mixture; however, the films cast from propanediols and ethylene glycols have superior mechanical properties to the membranes cast from the conventional solvent systems discussed previously. Furthermore, additional solvents can be added to the compositions disclosed herein without sacrificing or deleteriously affecting the mechanical properties of cast film produced from the disclosed dispersions. Adding such additional solvents to conventional polymer compositions comprising methanol or ethanol, however, causes membranes cast from such compositions to exhibit poor mechanical properties.

III. Polymer Compositions

The present disclosure describes composition embodiments useful for forming components of electrochemical systems, such as electrochemical fuel cells. In some embodiments, the disclosed compositions can be used to form uniformly-dispersed electrodes (that is, electrodes comprising films that are free of or do not comprise any precipitates or dispersed particles having particle sizes greater than 0.5 μm), which in turn are useful as a component of membrane electrode assemblies (e.g., for fuel cells and water electrolyzers). The compositions disclosed herein also may be used to recover cationic group-functionalized polyphenylene membranes and film casting processes. In this context, the term "recover" means that the polymer can be re-dissolved using a solvent and then re-cast and thereby reused in situations where it may be economically beneficial to recycle the polymer. In yet other embodiments, the polymer can be recovered so as to separate it from an electrocatalyst that is used with the polymer.

Cationic group-functionalized polyphenylene anion exchange polymers have excellent stability under low and/or high pH conditions and therefore are suitable for use in electrochemical devices. The compositions disclosed herein comprise at least one cationic group-functionalized polyphenylene polymer. In some embodiments, the cationic group-functionalized polyphenylene polymer can have a structure satisfying Formula I or Formula II, below. In some embodiments, a mixture of cationic group-functionalized polyphenylene polymers can be used, such as a mixture of two or more cationic group-functionalized polyphenylene polymers.

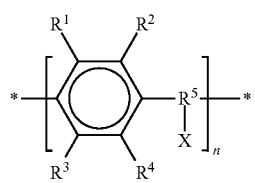

Formula I

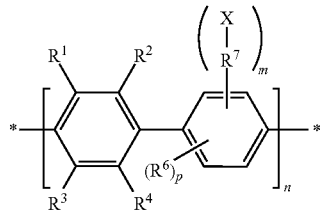

Formula II

With reference to Formula I, each of $R^1$, $R^2$, $R^3$, $R^4$, and $R^5$ independently can be hydrogen, halogen (e.g., bromo, fluoro, iodo, or chloro), an aliphatic group, an aryl group, or a combination thereof (e.g., aliphatic aryl or aryl aliphatic); each X independently can be selected from a cationic functional group; and n can range from 2 to 1000. In particular disclosed embodiments, $R^1$, $R^2$, $R^3$, $R^4$, and $R^5$ independently can be selected from hydrogen, fluoro, alkyl, alkenyl, alkynyl, phenyl, or a combination thereof (e.g., alkyl phenyl or phenyl alkyl and the like); each X independently can be selected from ammonium, sulfonium, phosphonium, guanidinium, imidazolium, or phosphazinium; and n can range from 2 to 500, or from 2 to 100, or 10 to 50, or 20 to 40.

With reference to Formula II, each of $R^1$, $R^2$, $R^3$, $R^4$, and $R^6$ independently can be hydrogen, an aliphatic group, an aryl group, or a combination thereof (e.g., aliphatic aryl or aryl aliphatic); each $R^7$ can be selected from carbonyl, sulfonyl, aliphatic, aryl, or a combination thereof (e.g., aliphatic aryl or aryl aliphatic); each X independently can be selected from a cationic functional group; n can range from 2 to 1000, m can range from 1 to 4; and p can range from 0 to 3. In particular disclosed embodiments, each of $R^1$, $R^2$, $R^3$, $R^4$, and $R^6$ independently can be selected from hydrogen, alkyl, alkenyl, alkynyl, phenyl, or a combination thereof (e.g., alkyl phenyl or phenyl alkyl, or the like); each $R^7$ independently can be selected from carbonyl, sulfonyl, alkyl, phenyl, or phenyl alkyl; each X independently can be selected from ammonium, sulfonium, phosphonium, guanidinium, imidazolium, or phosphazinium; n can range from 2 to 500, or from 2 to 100, or 10 to 50, or 20 to 40; m can be 1 or 2; and p can be 1 or 2.

In some embodiments, the cationic group-functionalized polyphenylene polymer can be selected from a benzyl ammonium-functionalized polyphenylene or an alkyl trimethyl ammonium-functionalized polyphenylene. Other exemplary cationic group-functionalized polyphenylene polymers are illustrated below in Table 1.

TABLE 1

Exemplary Cationic Group-Functionalized Polyphenylene Polymers

| Name | Structure |
| --- | --- |
| Benzyl trimethyl ammonium (or Benzyl trimethyl ammonium functionalized polyphenylene polymer) | Poly(phenylene)—C₆H₄—CH₂—N(CH₃)₃⁺  or [polyphenylene structure with four benzyl trimethyl ammonium groups] |
| Hexamethyl trimethyl ammonium (or alkyl trimethyl ammonium functionalized polyphenylene polymer) | Poly(phenylene)—(CH₂)₆—N(CH₃)₃⁺  or [poly(phenylene) repeat unit with Ph substituent and two hexyl-trimethylammonium chains]$_n$ |

TABLE 1-continued
Exemplary Cationic Group-Functionalized Polyphenylene Polymers
| Name | Structure |
|---|---|
| | 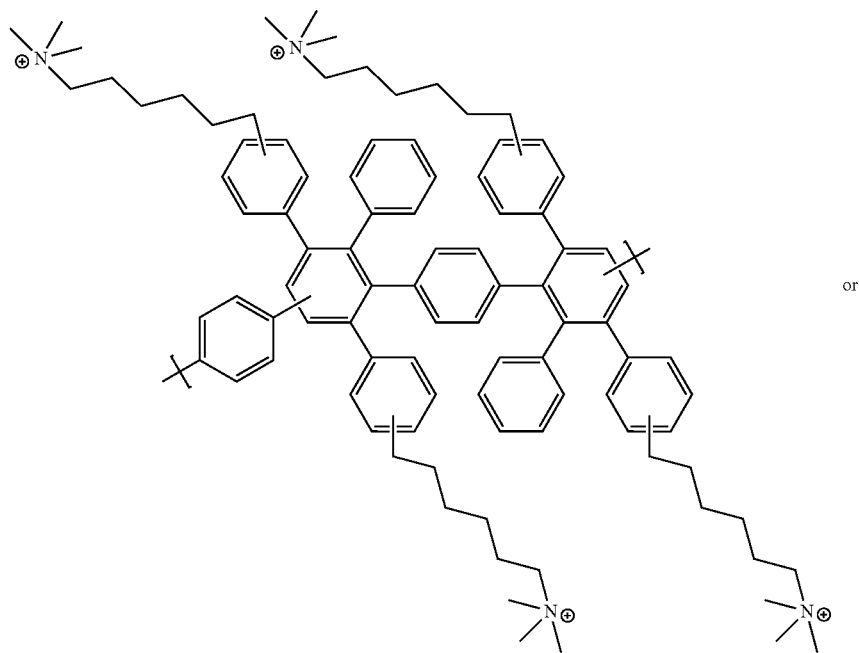 or |
| | 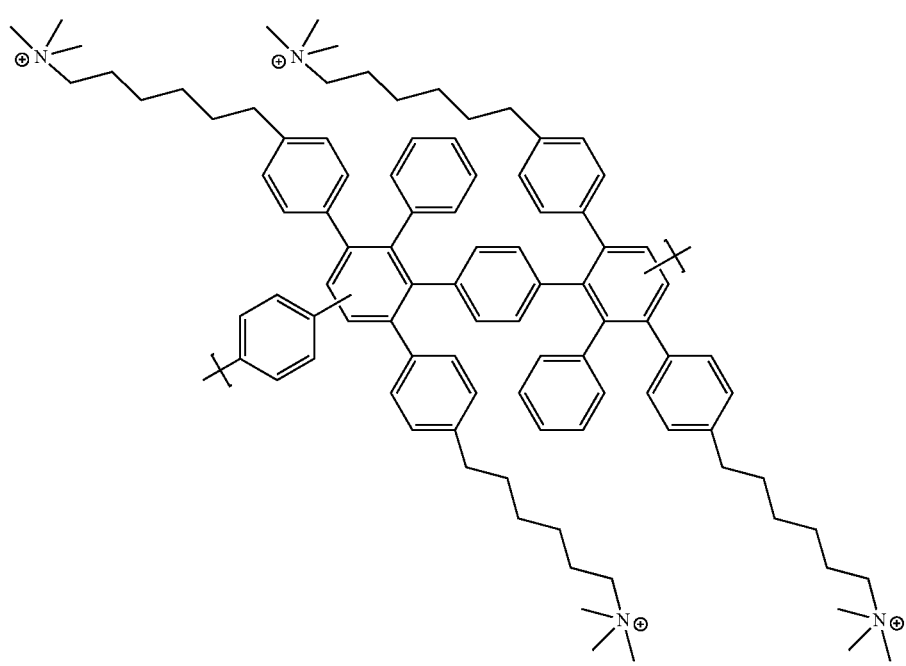 |

TABLE 1-continued
Exemplary Cationic Group-Functionalized Polyphenylene Polymers
| Name | Structure |
|---|---|
| Benzyl triethyl ammonium (or Benzyl triethyl ammonium functionalized polyphenylene polymer) | 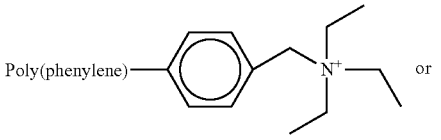 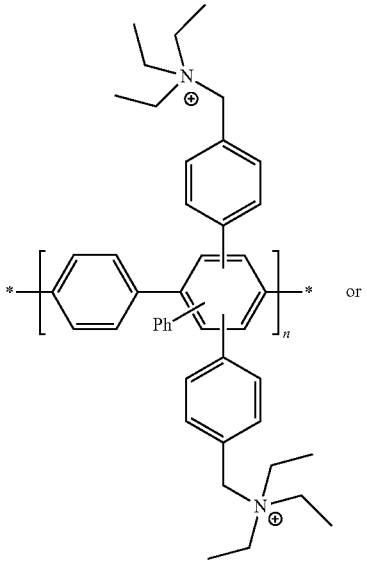 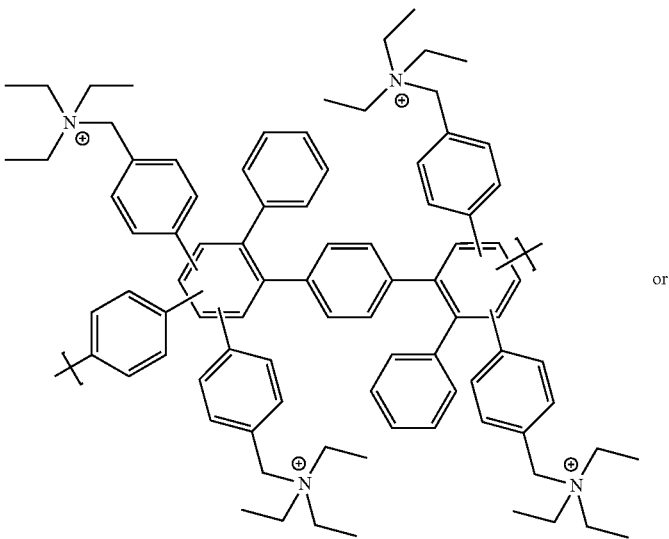 |

TABLE 1-continued
Exemplary Cationic Group-Functionalized Polyphenylene Polymers
| Name | Structure |
|---|---|
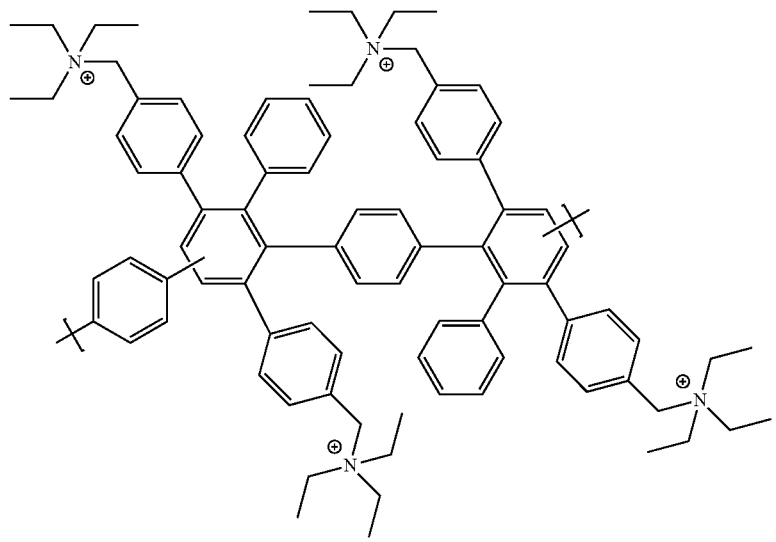
Phenyl pentamethyl guanidinium (or Phenyl pentamethyl guanidinium functionalized polyphenylene polymer)
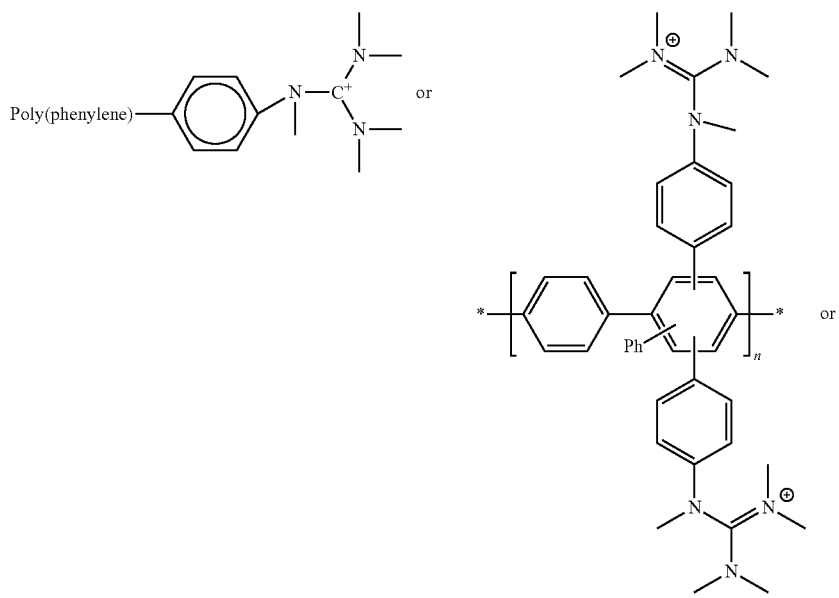

TABLE 1-continued

Exemplary Cationic Group-Functionalized Polyphenylene Polymers

| Name | Structure |
|---|---|
| | 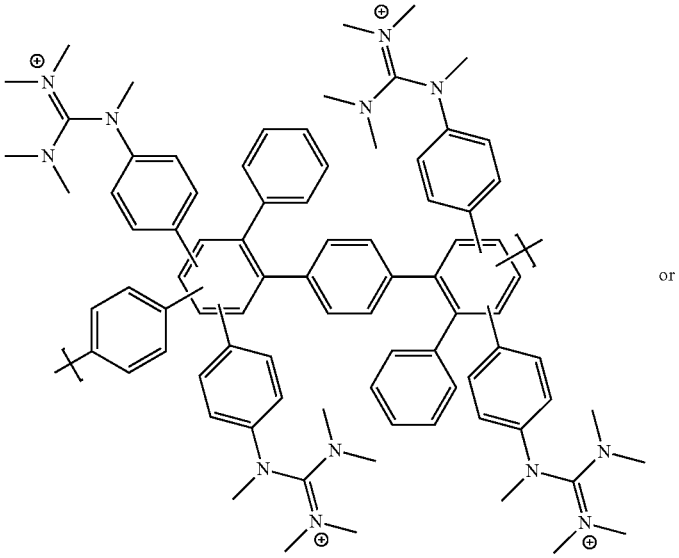 or 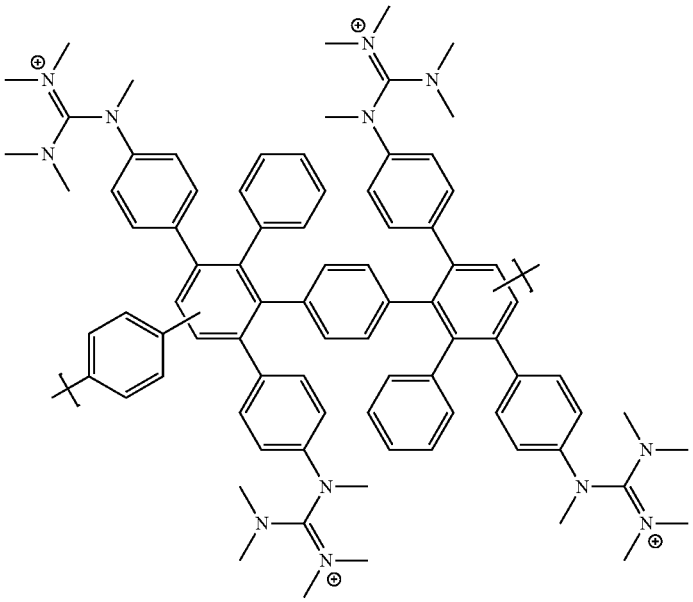 |

In some embodiments, the cationic group-functionalized polyphenylene polymers can exhibit an ion exchange capacity of from greater than zero to 5 or more, such as 0.5 to 5 or more, or from 1.0 to 3.0, or from 1.5 to 2.8. In some embodiments, the cationic group-functionalized polyphenylene polymers can comprise various counter ions including, but not limited to, hydroxide, fluoride, chloride, bromide, iodide, sulfate, carboxylate, or carbonate. In an independent embodiment, the cationic group-functionalized polyphenylene polymer does not comprise a hydroxide counter ion.

The cationic group-functionalized polyphenylene polymers can be synthesized using chemical reactions known to those of ordinary skill in the art, such as by using Diels-Alder chemistry as described by Hibbs, M. R. Fujomoto, C. H. Cornelius, C. J., Macromolecules 42, 8316-8321(2009), the relevant portion of which is incorporated herein by reference. In some embodiments, the disclosed compositions may comprise from 0.1% to 20%, such as from 0.1% to 10%, or 1% to 5% of a cationic group-functionalized polyphenylene polymer, or a mixture of such polymers.

The compositions disclosed herein further comprise a dispersion medium, such as a solvent or mixture of solvents, that is capable of forming a dispersion with the cationic group- polyphenylene polymer at a temperature that is equal to or below the dispersing medium's boiling point temperature. In some embodiments, the dispersion medium uniformly disperses the polymer. In particular embodiments, the dispersion medium exhibits a sufficient dispersing capability so as to uniformly disperse the polymer after heat processing the composition at a temperature equal to or below the dispersion medium's boiling point temperature.

The dispersion medium used in the disclosed compositions can comprise, consist essentially of, or consist of one or more polyols. In some embodiments, the dispersion medium used in the disclosed compositions can comprise, consist essentially of, or consist of one or more diols. In embodiments where the solvents consist essentially of one or more polyols (or consists essentially of one or more diols), the solvent is free of any component that deleteriously affects the composition, such as by decreasing the dispersing capabilities of the dispersion medium. In an independent embodiment, the composition does not comprise (or is free of) a monohydric alcohol having a low boiling point. In some embodiments, the composition is free non-suitable solvents would have a boiling point less than 100° C., such as 50° C. to 100° C., or 60° C. to 90° C., or 70° C. to 80° C. In some independent embodiments, the composition does not comprise (or is free of) a monohydric alcohol selected from methanol, ethanol, propanol, or butanol. In yet other independent embodiments, the composition does not comprise (or is free of) a polar, aprotic solvent that exhibits low solubility (or a solubility parameter that fails to provide sufficient dispersion of an anion exchange polymer). For example, polar, aprotic solvents having a solubility parameter less than 14 $cal^{1/2}cm^{-3/2}$ typically will not provide suitable polar interactions with the anion exchange polymer so as to provide a dispersion.

In some embodiments, the solvent used in the disclosed compositions comprises a polyol or a diol having a methyl to hydroxyl ratio that provides a value ranging from 1 to 2. In additional embodiments, the polyol or diol can have a methyl to hydroxyl ratio that provides a value ranging from 1 to 1.5. In some embodiments, the polyol or the diol used in the disclosed compositions can comprise a hydroxyl group located at C1 of the diol and also a hydroxyl group at another carbon atom of the diol chain, such as at the C2, C3, C4, or C5 (or other carbon atoms) of the diol.

Suitable examples of the polyols or diols that can be used in the compositions disclosed herein include, but are not limited to, 1,2-propanediol, 1,3-propanediol, ethylene glycol, 1,2-butanediol, 1,3-butanediol, 2,3-butanediol, 1,4-butanediol, and combinations thereof. In some embodiments, the polyol or diol can have a methyl to hydroxyl ratio that provides a value ranging from 1 to 2 and can be selected from, but not limited to, 1,2-propanediol, 1,3-propanediol, ethylene glycol, and combinations thereof. Exemplary polyols and diols having a hydroxyl group located at C1 of the diol and at C2 of the diol include, but are not limited to, 1,2-propanediol, ethylene glycol, 1,2-butanediol, and combinations thereof. In particular disclosed embodiments, the compositions disclosed herein can comprise from greater than 0% to 100% of a polyol or diol, such as from 1% to 99.9%, or 5% to 95%, or 10% to 95%, or 25% to 95%, or 50% to 95%, or 80% to 95%, or 85% to 90%.

IV. Methods of Making Compositions

Also disclosed herein are embodiments of methods of making the compositions. In some embodiments, the methods can comprise exposing a dispersion medium to a cationic group-functionalized polyphenylene polymer to form a dispersion of the polymer in the dispersion medium. In some embodiments, the methods can further comprise heating the dispersion medium and the cationic group-functionalized polyphenylene polymer at a temperature sufficient to facilitate uniform dispersion of the polymer. In some embodiments, the dispersion medium and the cationic group-functionalized polyphenylene polymer can be heated at ambient pressure. In particular disclosed embodiments, the dispersion medium and the cationic group-functionalized polyphenylene polymer are heated at a temperature that is at or below the boiling point of the dispersion medium, which can include a single solvent or a combination of solvents. In some exemplary embodiments, the temperature can range from 120° C. to 200° C., such as from 130° C. to 190° C., or 140° C. to 180° C.

The dispersion medium and the cationic group-functionalized polyphenylene polymer can be heated at temperatures described above for a time sufficient to facilitate uniform dispersion of the polymer. In some embodiments, the length of time can range from a period of three hours or less, such as 5 minutes to three hours, or 10 minutes to 2.5 hours, or 20 minutes to 2 hours, or 30 minutes to 1 hour. In exemplary embodiments, the dispersion was heated for 1 hour.

In some embodiments, the compositions can be used to make catalyst ink formulations used in fuel cell and water electrolyzer electrodes. In such embodiments, the composition can further comprise an electrocatalyst, a pore forming agent, or a polymeric coating, or a combination thereof. In some embodiments, one or more electrocatalysts can be dispersed in the composition comprising the dispersion medium and the cationic group-functionalized polyphenylene polymer. The amount of the electrocatalyst used can range from 0.1% by weight to 50% by weight, such as 0.1% to 40%, or 0.5% to 30%, or 1% to 20%. Compositions further comprising one or more electrocatalysts can be made by adding the electrocatalyst to a composition comprising the dispersion medium and the cationic group-functionalized polyphenylene polymer and then mixing the resulting combination, such as by using a shaker, magnetic spin bar, mechanical stirrer, sonicator, or any combination thereof. The electrocatalyst can be dispersed with the anionic polyphenylene polymer.

In some embodiments, the one or more electrocatalysts can comprise platinum, gold, iridium, palladium, or a platinum alloy such as, but not limited to, platinum/chromium, platinum/cobalt and platinum/iron alloys. In some embodiments, the one or more electrocatalyst can comprise at least one transition metal such as ruthenium, iron, chromium, cobalt, molybdenum, manganese, magnesium, nickel, osmium, rhodium, tungsten, rhenium, yttrium, titanium, or combinations thereof. In yet additional embodiments, the electrocatalyst can comprise carbon-based catalysts, such as porous carbon particulate, fiber, graphene, or combinations thereof.

In some embodiments, the electrocatalyst-containing composition can be further diluted by adding diols or other low boiling solvents. In particular embodiments, the dilution solvent can have a boiling point that is equal to or below that of the dispersion medium. Such dilution solvents can be used to help reduce the viscosity of the electrocatalyst-containing composition and further can be removed independently of the dispersion medium by heating thereby minimizing the mechanical property loss of cast thin film. In some embodiments, suitable dilution solvents can be selected from, but are not limited to, water, methanol, ethanol, 1-propanol, 2-propanol, 1,2 propylene glycol, 1,3 propylene glycol, ethylene glycol, or combinations thereof.

V. Methods of Use

In particular disclosed embodiments, the compositions can be used to make cast anion exchange polymer membranes having chemical and mechanical properties superior to anion exchange polymer membranes formed using conventional dispersion media (e.g., water, methanol, ethanol, 1-propanol, 2-propanol, or mixtures thereof; or dimethyl acetamide, or N-methyl pyrrolidone). In some embodiments, the compositions can be used to make anion exchange polymer membranes having improved strength, elongation, and/or tensile toughness as compared to anion exchange polymer membranes formed from conventional dispersion media (e.g., water, methanol, ethanol, 1-propanol, 2-propanol, or mixtures thereof; or dimethyl acetamide, or N-methyl pyrrolidone).

In some embodiments, the disclosed compositions comprise dispersion media that produces anion exchange polymer membranes having a tensile strength ranging from 12 MPa to 35 MPa, such as 20 MPa to 34 MPa, or 25 MPa to 34 MPa, or 30 MPa to 34 MPa. In exemplary embodiments, the anion exchange polymer membranes made using the compositions disclosed herein can exhibit tensile strength ranging from 25 MPa to 33 MPa, or 17 MPa to 29 MPa, or 26 MPa to 34 MPa, or 12 MPa to 18 MPa, or 25 MPa to 31 MPa. In some embodiments, the tensile strength can be determined by stress-strain measurements carried out using a dynamic mechanical thermal analyzer (TA Q800-RH). Temperature and humidity can be controlled in an environmental chamber. The chamber temperature can be equilibrated at 50° C. with 50% RH for 40-60 minutes. The tensile test can be performed using 0.5 in.×1.0 inch rectangular test strips with membranes. A load ramp of 0.5 MPa/min can be used. Each sample can be tested twice. When recording the stress-strain curves, the maximum stress recorded is reported as the tensile strength.

In some embodiments, the disclosed compositions comprise dispersion media that produces anion exchange polymer membranes that exhibit elongation percentages ranging from 2% to 44%, such as 10% to 34%, or 20% to 34%. In some embodiments, the anion exchange polymer membranes made using the compositions disclosed herein can exhibit elongation percentages ranging from 2% to 12%, or 10% to 20%, or 11% to 15%, or 20% to 34%, or 42% to 44%. In some embodiments, the elongation percentage can be determined by stress-strain measurements carried out using a dynamic mechanical thermal analyzer (TA Q800-RH). Temperature and humidity can be controlled in an environmental chamber. The chamber temperature can be equilibrated at 50° C. with 50% RH for 40-60 minutes. The tensile test can be performed using 0.5 in. x 1.0 inch rectangular test strips with membranes. A load ramp of 0.5 MPa/min can be used. Each sample can be tested twice. When recording the stress-strain curves, the elongation at break from the original sample length is reported as elongation at break.

In yet additional embodiments, the disclosed compositions comprise dispersion media that produces anion exchange polymer membranes that exhibit tensile toughness values ranging from greater than 0 to 20 MPa, such as 1 MPa to 15 MPa, or 2 MPa to 10 MPa, or 3 MPa to 7 MPa. In some embodiments, the anion exchange polymer membranes made using the compositions disclosed herein can exhibit tensile toughness values ranging from greater than 0 to 1 MPa, or 2 MPa to 4 MPa, or 3 MPa to 7 MPa, or 1 MPa to 2 MPa, or 7 MPa to 10 MPa. In some embodiments, the tensile toughness can be determined by stress-strain measurements carried out using a dynamic mechanical thermal analyzer (TA Q800-RH). Temperature and humidity can be controlled in an environmental chamber. The chamber temperature can be equilibrated at 50° C. with 50% RH for 40-60 minutes. The tensile test can be performed using 0.5 in.×1.0 inch rectangular test strips with membranes. A load ramp of 0.5 MPa/min can be used. Each sample can be tested twice. When recorded the stress-strain curves, the area of the stress-strain curves is measured and reported as tensile toughness.

In some embodiments, the polymer dispersion compositions disclosed herein can be used to make catalyst ink compositions, which can comprise an electrocatalyst. Such catalyst ink compositions can be used to from an electrode. The electrode may form part of a membrane electrode assembly for a fuel cell, or it can be used in water electrolyzer or other suitable applications. FIG. 1 shows a general membrane electrode assembly ("MEA") used in membrane-based electrochemical systems. With reference to FIG. 1, membrane electrode assembly 100 can comprise an anode 102, a cathode 104, and an ion exchange polymer membrane 106, which can be made using the compositions disclosed herein. The anode 102 and/or cathode 104 can comprise an electrocatalyst 108 and an ion exchange ionomeric binder 110. Electrode preparation steps described below can be used to prepare such MEAs:

The anion exchange polyphenylene polymer membrane is dispersed in a suitable solvent system as described herein. Typically, the polymer membrane is dispersed in a solvent at a desired solid content, such as ca. 5 wt %. The membrane and solvent dispersion is placed in a convection oven and the temperature of the oven is increased up to the dispersion temperature. After uniform dispersion is obtained (typically 1 or 2 hours), the solution is removed from the convection oven and allowed to cool. An electrocatalyst (such as carbon supported Pt catalyst) is mixed with the polymer membrane dispersion and a further diluting solvent is added and sonication or stirring is used to mix the components. The electrocatalyst ink dispersion is applied onto a gas diffusion layer over time (often hand painting, spraying or screen printing is used). The weight of the gas diffusion layer after drying is measured during this process to determine the catalyst loading. The dried catalyst coated electrode is immersed in 0.5 M NaOH solution to change the counter ion to hydroxide form (in some embodiments, this is an optional step; if a hydroxide-form polymer is used in the steps above, this step is not necessary). The dried catalyst coated electrodes are rinsed with deionized water several times to remove all or substantially all NaOH from the gas diffusion layer. The gas diffusion layer is dried at 60° C. for 30 minutes to 1 hour under vacuum conditions to remove water. The anion exchange membranes are assembled with two gas diffusion layer electrodes in a single cell hardware.

VI. Examples

EXAMPLE 1

Example 1 describes the preparation of benzyl trimethyl ammonium functionalized polyphenylene polymers in various dispersing agents.

0.2 g of benzyl trimethyl ammonium functionalized polyphenylene (IEC=1.8 meq/g) with bromide counter ion, and the polymer itself being in the form of membrane having a thickness of about 50 micrometer, were placed in a 20 ml vial. 10 g of a solvent was placed in the vial. The vial was heated in a convection oven. The samples which were dispersed well in a liquid medium were cast on clean glass at 80° C. for 2 hours. The cast membranes were further dried at 140° C. for 4 hours. The cast membranes were cut into 0.25"×1" strips and performed tensile test under 50° C., 50% RH conditions. Table 2 shows the dispersion state after the heat treatment.

TABLE 2

| Solvent | Heating temp (° C.) | Dispersion-ability | Film formation | Tensile properties of cast membrane | | |
|---|---|---|---|---|---|---|
| | | | | Strength (MPa) | Elongation (%) | Tensile Toughness* (MPa) |
| Water | 100 | No | — | — | — | — |
| Methanol | 64 | Yes | Yes | 12.7 ± 0.2 | 26 ± 9 | 2.1 ± 0.8 |
| Ethanol | 78 | Yes | Yes | 20.5 ± 2.5 | 30 ± 4 | 4.3 ± 1.3 |
| 1-Propanol | 97 | No | — | — | — | — |
| 2-Propanol | 82 | No | — | — | — | — |
| Water/2-propanol (1:1) | 82 | Yes | No | — | — | — |
| 1,2 Propanediol | 140 | Yes | Yes | 29.3 ± 3.5 | 43 ± 1 | 8.7 ± 1.4 |
| 1,3 Propanediol | 140 | Yes | Yes | 23.0 ± 5.5 | 13 ± 2 | 1.6 ± 0.4 |
| Ethylene glycol | 140 | Yes | Yes | 30.3 ± 3.4 | 27 ± 7 | 5.0 ± 1.9 |
| 1,2 Butanediol | 140 | Yes | Yes | 15.0 ± 2.6 | 7.0 ± 5 | 0.5 ± 0.5 |
| 1,4 Butanediol | 140 | Yes | Yes | 28.2 ± 3.1 | 14.9 ± 5 | 3.2 ± 1.0 |
| 1,2 Pentanediol | 160 | No | — | — | — | — |
| Dimethyl acetamide | 140 | No | — | — | — | — |
| N-methyl m-pyrrolidone | 160 | No | — | — | — | — |

EXAMPLE 2

Example 2 describes the preparation of alkyl trimethyl ammonium functionalized polyphenylene polymers (see Table 1) in various dispersion media. The techniques used for this example were similar to those used above for Example 1 and the benzyl trimethyl ammonium functionalized polyphenylene was replaced with an alkyl trimethyl ammonium functionalized polyphenylene polymer. Results are summarized in Table 3.

TABLE 3

| Solvent | Heating temperature (° C.) | Dispersion-ability | Film formation |
|---|---|---|---|
| Water | 100 | No | — |
| Methanol | 64 | No | — |
| Ethanol | 78 | No | — |
| 1-Propanol | 97 | No | — |
| 2-Propanol | 82 | No | — |
| 1,2 Propanediol | 160 | Yes | Yes |
| 1,3 Propanediol | 160 | Yes | Yes |
| Ethylene glycol | 160 | Yes | Yes |
| 1,2 Butanediol | 160 | Yes | Yes |
| 1,2 Pentanediol | 160 | No | — |
| Dimethyl acetamide | 140 | No | — |
| N-methyl m-pyrrolidone | 160 | No | — |

EXAMPLE 3

Example 3 compares the intermediate temperature fuel cell performance of MEAs prepared from polyphenylene ethylene glycol dispersion and without the polyol dispersion.

The benzyl trimethyl ammonium functionalized polyphenylene polymer/ethylene glycol dispersion was prepared from Example 1. Catalyst ink was prepared using the dispersion as follows: 10 mg of Pt black nanoparticle catalysts were mixed with 88 mg of 1 wt % benzyl trimethyl ammonium polyphenylene ethylene glycol dispersion. 500 mg of methanol was added into the catalyst ink mixture. The catalyst ink was sonicated for 90 seconds. The prepared catalyst ink was painted on a gas diffusion layer using a brush at 100° C. on a vacuum plate until the catalyst loading reached 0.6 $mg_{Pt}/cm^2$. The catalyst coated gas diffusion layer was immersed in 85% phosphoric acid solution for 5 minutes at room temperature. A PA-doped tinpyrophosphate/perfluorinated polymer composite membrane was prepared.

Membrane electrode assemblies (MEAs) were fabricated using the PA-doped tinpyrophosphate/perfluorinated polymer composite membrane and the catalyst coated gas diffusion layer.

For comparison purposes, a control catalyst ink was prepared without the benzyl trimethyl ammonium polyphenylene/ethylene glycol dispersion as follows: 10 mg of Pt black nanoparticle catalysts were mixed with 500 mg of 0.1 wt % tinpyrophosphate dispersed in methanol into the catalyst ink mixture. The catalyst ink was sonicated for 90 seconds. The prepared catalyst ink was painted on a gas diffusion layer using a brush at 100° C. on a vacuum plate until the catalyst loading reached 0.6 $mg_{Pt}/cm^2$. A PA-doped tinpyrophosphate/perfluorinated polymer composite membrane was prepared. MEAs were fabricated using the PA-doped tinpyrophosphate/perfluorinated polymer composite membrane and the prepared the catalyst coated gas diffusion layer.

Figure 2:
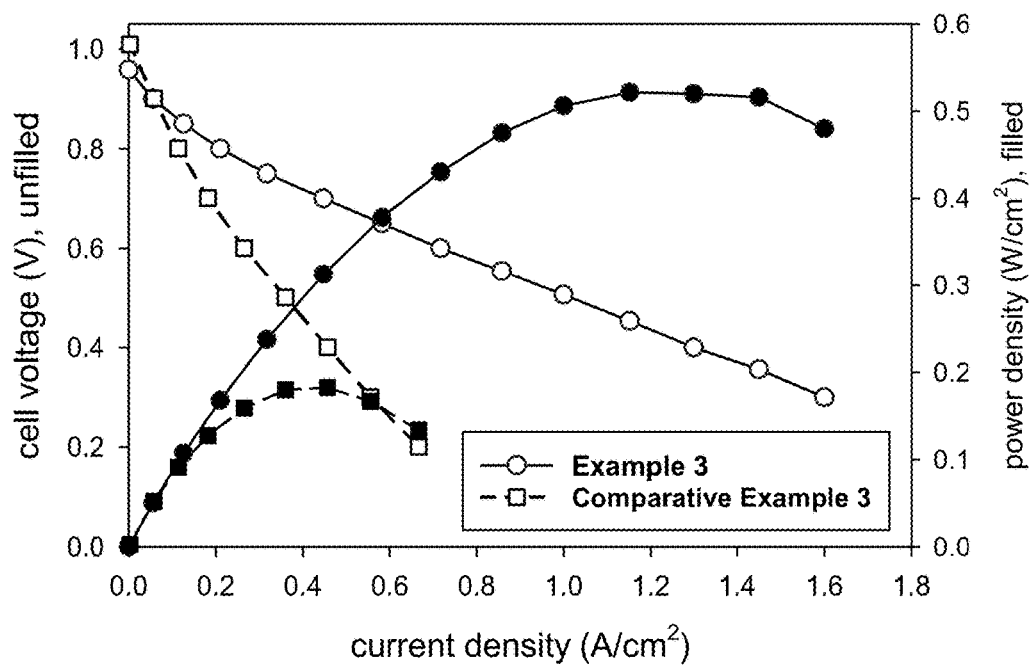
FIG. 2 is a graph of voltage and power density as a function of current density, which illustrates an acid fuel cell performance comparison between a membrane electrode assembly made using a representative composition embodiment disclosed herein (represented by "-●-" for power density, and "-○-" for cell voltage) and a membrane electrode assembly made without a polyol dispersion (represented by "-■-" for power density, and "-□-" for cell voltage).

FIG. 2 compares the fuel cell performance between the MEAs prepared from the polyol dispersion and prepared without the polyol dispersion. The acid fuel cell performance using the MEA prepared from polyol dispersion shows superior performance.

EXAMPLE 4

Example 4 compares the alkaline fuel cell performance of MEAs prepared from the ethylene glycol dispersion and prepared from the methanol dispersion.

The alkyl trimethyl ammonium functionalized polyphenylene polymer in ethylene glycol was prepared from Example 2. The catalyst ink using the alkyl trimethyl ammonium functionalized polyphenylene polymer was prepared as follows: 8.6 mg of carbon supported Pt catalyst (Pt wt %=47%) was mixed with 214 mg of 1 wt % alkyl trimethyl ammonium functionalized polyphenylene in ethylene glycol dispersion. 500 mg of 1-propanol was added into the catalyst ink mixture. The catalyst ink was sonicated for 90 seconds. The prepared catalyst ink was painted on a gas diffusion layer using a brush at 100° C. on a vacuum plate until the catalyst loading reached 0.4 $mg_{Pt}/cm^2$. MEAs were fabricated using a quaternized poly(styrene-ethylene-butylene-styrene) membrane and the prepared the catalyst coated gas diffusion layer.

For comparison purposes, the benzyl trimethyl ammonium functionalized polyphenylene polymer in methanol was prepared from Example 1. In some embodiments, the alkyl trimethyl ammonium functionalized polyphenylene polymer was not prepared in methanol due to the poor solubility. The catalyst ink using the benzyl trimethyl ammonium functionalized polyphenylene polymer was prepared as follows: 8.6 mg of carbon supported Pt catalyst (Pt wt %=47%) was mixed with 214 mg of 1 wt % benzyl trimethyl ammonium functionalized polyphenylene in methanol dispersion. 500 mg of 1-propanol was added into the catalyst ink mixture. The catalyst ink was sonicated for 90 seconds. The prepared catalyst ink was painted on a gas diffusion layer using a brush at 100° C. on a vacuum plate until the catalyst loading reached 0.4 $mg_{Pt}/cm^2$. MEAs were fabricated using a quaternized poly(styrene-ethylene-butylene-styrene) membrane and the prepared the catalyst coated gas diffusion layer.

Figure 3:
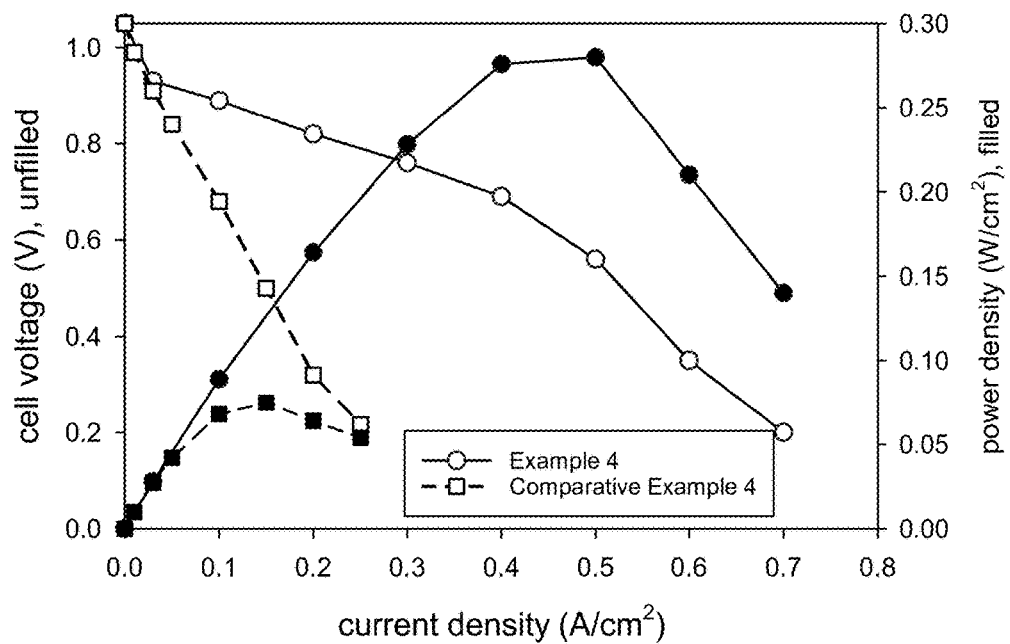
FIG. 3 is a graph of voltage and power density as a function of current density, which illustrates an alkaline fuel cell performance comparison between a membrane electrode assembly made using a representative composition embodiment disclosed herein (represented by "-●-" for power density, and "-○-" for cell voltage) and a membrane electrode assembly made using a methanol dispersion (represented by "-■-" for power density, and "-□-" for cell voltage).

FIG. 3 compares the fuel cell performance between the MEA prepared from ethylene glycol dispersion and the MEA prepared with methanol dispersion. As can be seen by FIG. 3, the MEA performance using the MEA prepared from the polyol dispersion shows superior performance.

In view of the many possible embodiments to which the principles of the present disclosure may be applied, it should be recognized that the illustrated embodiments are only preferred examples of the present disclosure and should not be taken as limiting the scope of the disclosure. Rather, the scope of the present disclosure is defined by the following claims. I therefore claim as my invention all that comes within the scope and spirit of these claims.

I claim:

1. A composition for use in an electrochemical system, comprising:

a cationic group-functionalized polyphenylene polymer having a structure satisfying a formula

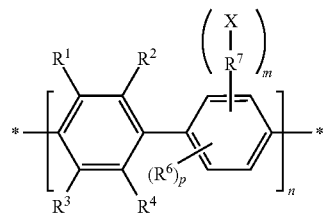

wherein each of $R^1$, $R^2$, $R^3$, $R^4$, and $R^6$ independently is selected from hydrogen, fluoro, an aliphatic group, an aryl group, or a combination thereof; $R^7$ is selected from aliphatic, aryl, carbonyl, sulfonyl, or a combination thereof; each X independently is selected from a cationic functional group; n ranges from 2 to 1000, m ranges from 1 to 4; and p ranges from 0 to 3; and a dispersion medium comprising a polyol having a methyl to hydroxyl ratio that provides a value ranging from 1 to 2.

2. The composition of claim 1, wherein each X independently is selected from ammonium, sulfonium, phosphonium, guanidinium, imidazolium, phosphazinium, or combinations thereof.

3. The composition of claim 1, wherein $R^7$ is carbonyl, sulfonyl, alkyl, phenyl, or phenyl alkyl.

4. The composition of claim 1, wherein the cationic group-functionalized polyphenylene polymer is selected from -continued
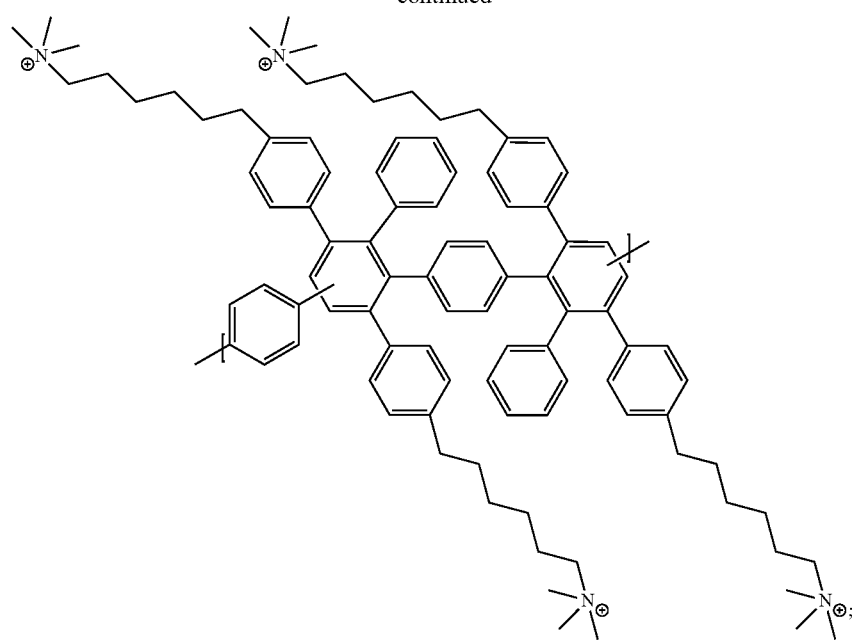
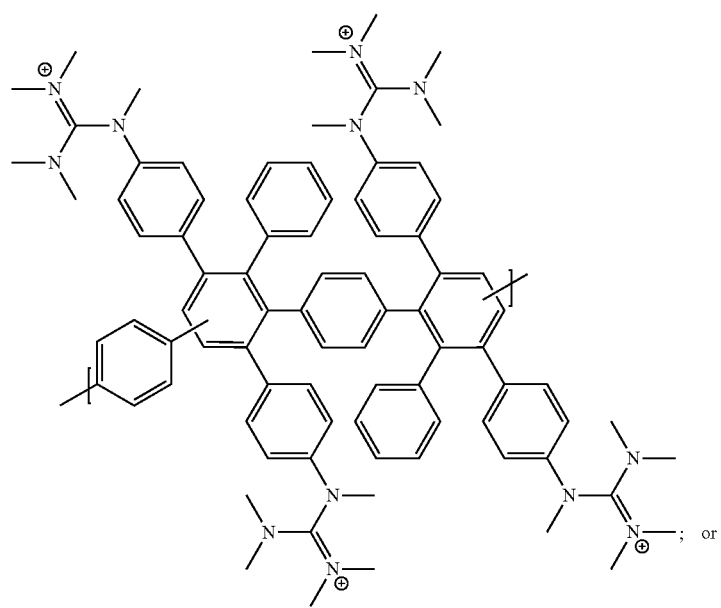

-continued

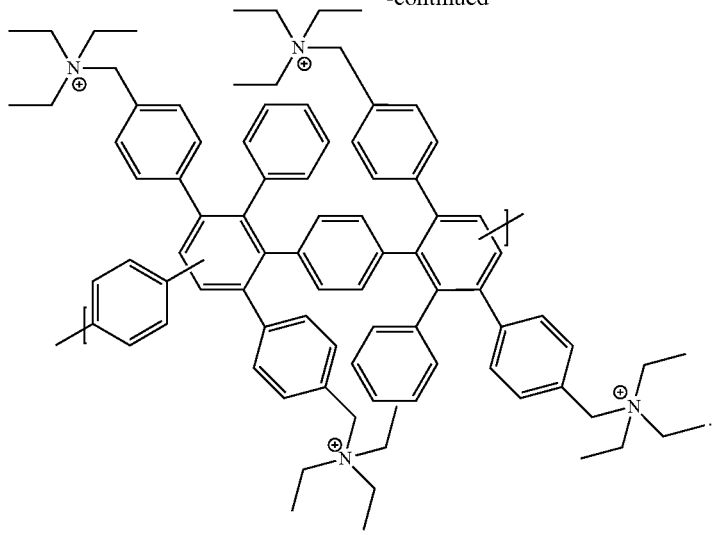

5. The composition of claim 1, wherein the polyol is a diol comprising a hydroxyl group located at C1 of the diol and a hydroxyl group at C2 of the diol.

6. The composition of claim 1, wherein the dispersion medium comprises 1,2-propanediol, 1,2-propanediol, 1,3-propanediol, ethylene glycol, 1,2-butanediol, 1,3-butanediol, 2,3-butanediol, 1,4-butanediol, and combinations thereof.

7. The composition of claim 1, wherein the composition further comprises one or more electrocatalysts.

8. The composition of claim 7, wherein the electrocatalyst comprises a metal selected from platinum, gold, iridium, palladium, or a combination thereof; a transition metal selected from ruthenium, iron, chromium, cobalt, molybdenum, manganese, magnesium, nickel, osmium, rhodium, tungsten, rhenium, yttrium, titanium, or combinations thereof; a metal alloy selected from a platinum/chromium alloy, a platinum/cobalt alloy, a platinum/iron alloy, or a combination thereof; a transition metal alloy; a carbon-based catalyst selected from porous carbon particulate, fiber, graphene, or combinations thereof; or a combination thereof.

9. The composition of claim 1, wherein the composition further comprises a dilution solvent having a boiling temperature below a boiling temperature of the dispersion medium.

10. An anion exchange polymer membrane for use in an electrochemical system, comprising a cationic group-functionalized polyphenylene polymer having a structure satisfying a formula

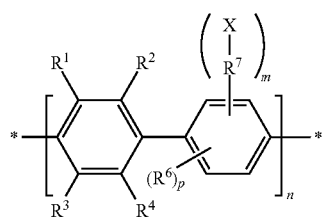

wherein each of $R^1$, $R^2$, $R^3$, $R^4$, and $R^6$ independently is selected from hydrogen, fluoro, an aliphatic group, an aryl group, or a combination thereof; $R^7$ is selected from carbonyl, sulfonyl, aliphatic, aryl, or a combination thereof; each X independently is selected from a cationic functional group; n ranges from 2 to 1000, m ranges from 1 to 4; and p ranges from 0 to 3; and wherein the anion exchange polymer membrane exhibits a tensile strength ranging from 12 MPa to 35 MPa, a elongation percentage ranging from 2% to 44%, a tensile toughness of 1 MPa to 20MPa, or a combination thereof.

11. The anion exchange polymer membrane of claim 10, further comprising one or more electrocatalysts.

12. The anion exchange polymer membrane of claim 11, wherein the one or more electrocatalyst is uniformly distributed in the anion exchange polymer membrane.

13. The anion exchange polymer membrane of claim 11 wherein the electrocatalyst comprises a metal, a transition metal, a metal alloy, a transition metal alloy, a carbon-based catalyst, or a combination thereof.

14. The anion exchange polymer membrane of claim 10, wherein the electrochemical system is an alkaline electrochemical system.

15. The anion exchange polymer membrane of claim 10, wherein the electrochemical system is an acidic electrochemical system.

16. An electrochemical device, comprising:
a composition comprising a cationic group-functionalized polyphenylene polymer having a structure satisfying a formula

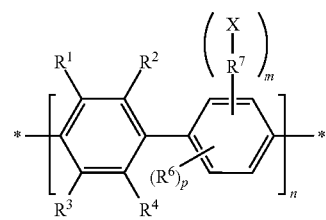

wherein each of $R^1$, $R^2$, $R^3$, $R^4$, and $R^6$ independently is selected from hydrogen, fluoro, an aliphatic group, an aryl group, or a combination thereof; $R^7$ is selected from carbonyl, sulfonyl, aliphatic, aryl, or a combination thereof; each X independently is selected from a cationic functional group; n ranges from 2 to 1000, m ranges from 1 to 4; and p ranges from 0 to 3; and a dispersion medium comprising a polyol having a methyl to hydroxyl ratio that provides a value ranging from 1 to 2.

17. An electrochemical device, comprising an anion exchange membrane comprising a cationic group-functionalized polyphenylene polymer having a structure satisfying a formula

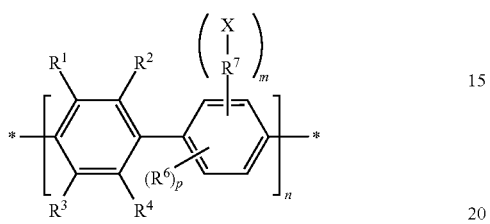

wherein each of $R^1$, $R^2$, $R^3$, $R^4$, and $R^6$ independently is selected from hydrogen, fluoro, an aliphatic group, an aryl group, or a combination thereof; $R^7$ is selected from carbonyl, sulfonyl, aliphatic, aryl, or a combination thereof; each X independently is selected from a cationic functional group; n ranges from 2 to 1000, m ranges from 1 to 4; and p ranges from 0 to 3; and wherein the anion exchange polymer membrane exhibits a tensile strength ranging from 12 MPa to 35 MPa, a elongation percentage ranging from 2% to 44%, a tensile toughness of 1 MPa to 20MPa, or a combination thereof.

* * * * *